United States Patent
Choi et al.

(10) Patent No.: US 8,947,584 B2
(45) Date of Patent: Feb. 3, 2015

(54) APPARATUS, AND ASSOCIATED METHOD, FOR A CAMERA MODULE OF ELECTRONIC DEVICE

(75) Inventors: Yun Seok Choi, Waterloo (CA); Qian Wang, Waterloo (CA); Graham Charles Townsend, Menlo Park, CA (US)

(73) Assignee: BlackBerry Limited, Waterloo (CA)

( * ) Notice: Subject to any disclaimer, the term of this patent is extended or adjusted under 35 U.S.C. 154(b) by 218 days.

(21) Appl. No.: 13/178,337

(22) Filed: Jul. 7, 2011

(65) Prior Publication Data

US 2012/0140108 A1 Jun. 7, 2012

Related U.S. Application Data

(60) Provisional application No. 61/418,494, filed on Dec. 1, 2010.

(51) Int. Cl.

| | |
|---|---|
| *G03B 13/00* | (2006.01) |
| *H04N 5/232* | (2006.01) |
| *H04N 9/68* | (2006.01) |
| *H04N 5/262* | (2006.01) |
| *G06K 9/40* | (2006.01) |
| *G02B 27/00* | (2006.01) |
| *G02B 7/08* | (2006.01) |
| *G02B 13/00* | (2006.01) |

(52) U.S. Cl.
CPC ............ *G02B 27/0075* (2013.01); *G02B 7/08* (2013.01); *G02B 13/001* (2013.01)
USPC ........... 348/354; 348/237; 348/239; 348/345; 382/255

(58) Field of Classification Search
USPC ............ 348/208.99–208.16, 222.1, 234–237, 348/239, 266–283, 335, 343–357; 382/254–275
See application file for complete search history.

(56) References Cited

U.S. PATENT DOCUMENTS

| | | | |
|---|---|---|---|
| 6,611,289 | B1 | 8/2003 | Yu et al. |
| 7,633,537 | B2 | 12/2009 | Hoshuyama |
| 7,646,977 | B2 * | 1/2010 | Flannery ....................... 396/222 |
| 8,330,840 | B2 | 12/2012 | Lenchenkov |
| 8,400,555 | B1 | 3/2013 | Georgiev et al. |
| 2003/0011888 | A1 | 1/2003 | Cox et al. |
| 2003/0025821 | A1 * | 2/2003 | Bean et al. .................... 348/345 |
| 2003/0151679 | A1 * | 8/2003 | Amerson et al. ........... 348/231.6 |
| 2004/0061800 | A1 * | 4/2004 | Yamazaki ..................... 348/349 |
| 2004/0100573 | A1 * | 5/2004 | Nonaka ......................... 348/345 |
| 2005/0160112 | A1 | 7/2005 | Makela et al. |

(Continued)

OTHER PUBLICATIONS

CIPO, Office Action, Application No. 2,791,617, Mar. 18, 2014, 3 pgs.

(Continued)

*Primary Examiner* — Michael Osinski
(74) *Attorney, Agent, or Firm* — The Danamraj Law Group, P.C.

(57) ABSTRACT

A camera module is provided for an electronic device, such as a wireless mobile station or standalone device. The camera module includes a low F-stop lens assembly that is translatable into a desired position. An image of a subject is provided to an EDOF assembly, including a sensor assembly, and an extended-depth-of-field processor. The extended-depth-of-field processor provides for formation of a resultant, recorded image that exhibits improved depth of field characteristics.

19 Claims, 2 Drawing Sheets

(56) References Cited

U.S. PATENT DOCUMENTS

| | | | |
|---|---|---|---|
| 2006/0054782 A1 | 3/2006 | Olsen et al. | |
| 2006/0061678 A1* | 3/2006 | Yamazaki | 348/349 |
| 2006/0198623 A1* | 9/2006 | Ono | 396/89 |
| 2007/0019883 A1* | 1/2007 | Wong et al. | 382/276 |
| 2007/0034777 A1 | 2/2007 | Tuckerman et al. | |
| 2007/0152062 A1* | 7/2007 | He et al. | 235/462.32 |
| 2007/0189750 A1* | 8/2007 | Wong et al. | 396/121 |
| 2007/0285557 A1* | 12/2007 | Wu | 348/345 |
| 2007/0295843 A1 | 12/2007 | Smith | |
| 2008/0013941 A1* | 1/2008 | Daley | 396/121 |
| 2008/0080028 A1 | 4/2008 | Bakin et al. | |
| 2008/0166117 A1* | 7/2008 | Li et al. | 396/121 |
| 2008/0278610 A1 | 11/2008 | Boettiger | |
| 2008/0303919 A1 | 12/2008 | Egawa | |
| 2009/0009584 A1 | 1/2009 | Lee et al. | |
| 2009/0015681 A1* | 1/2009 | Pipkorn | 348/208.12 |
| 2009/0059021 A1* | 3/2009 | Rimon et al. | 348/222.1 |
| 2009/0059057 A1* | 3/2009 | Long et al. | 348/343 |
| 2009/0102946 A1* | 4/2009 | Tischer | 348/231.99 |
| 2009/0167928 A1* | 7/2009 | Asukabe et al. | 348/345 |
| 2009/0169122 A1* | 7/2009 | He et al. | 382/238 |
| 2009/0175554 A1* | 7/2009 | Matsushita | 382/255 |
| 2009/0196489 A1* | 8/2009 | Le | 382/148 |
| 2009/0196522 A1* | 8/2009 | Hikida | 382/255 |
| 2009/0213239 A1* | 8/2009 | Yoshida | 348/222.1 |
| 2010/0097491 A1 | 4/2010 | Farina et al. | |
| 2010/0177235 A1 | 7/2010 | Duparre et al. | |
| 2011/0102638 A1 | 5/2011 | Susanu et al. | |
| 2012/0019703 A1* | 1/2012 | Thorn | 348/333.03 |
| 2012/0050562 A1 | 3/2012 | Perwass et al. | |
| 2012/0105590 A1* | 5/2012 | Fukumoto et al. | 348/46 |
| 2013/0128077 A1 | 5/2013 | Georgiev | |

OTHER PUBLICATIONS

SIPO, First Office Action, Application No. 201210382856.0, Jun. 12, 2014, 3 pgs.

EPO, Communication pursuant to Article 94(3) EPC, Application No. 11188618.0, Jun. 26, 2014, 7 pgs.

USPTO, Office Action, U.S. Appl. No. 13/293,300, Jul. 30, 2014, 16 pgs.

USPTO, Office Action, U.S. Appl. No. 13/293,300, Jun. 6, 2013, 12 pgs.

USPTO, Office Action, U.S. Appl. No. 13/293,300, Feb. 5, 2013, 12 pgs.

SIPO, Second Office Action, Application No. 201110354796.7, Jul. 2, 2014, 4 pgs.

EPO, Communication Pursuant to Article 94(3) EPC, Application No. 11188618.0, Feb. 27, 2014, 6 pgs.

EPO, Extended Search Report, Application No. 11188618.0, Mar. 12, 2012, 6 pgs.

USPTO, Office Action, U.S. Appl. No. 13/293,300, Oct. 24, 2014, 18 pgs.

* cited by examiner

APPARATUS, AND ASSOCIATED METHOD, FOR A CAMERA MODULE OF ELECTRONIC DEVICE

CROSS-REFERENCE OF RELATED APPLICATION

The present application claims priority to U.S. Provisional Application Ser. No. 61/418,494 filed on Dec. 1, 2010, the contents of which are incorporated herein by reference.

The present disclosure relates generally to a manner by which to record an image of a subject by a camera module, such as the camera module of a portable mobile station or other wireless device. More particularly, the present disclosure relates to an apparatus, and an associated method, by which to record the image of the subject at an extended depth of field element, using extended depth of field image-portion selection, focused by a camera lens translatable into a focus position.

A translatable camera lens of low F-stop, which permits, improved performance in low-light conditions, is used together with extended-depth-of-field image formation, which improves the depth of field characteristics of the resultant, recorded image relative to conventional digital-camera, recording elements.

BACKGROUND

Recent years have been witness to many changes permitted as a result of technological advancements. Many new services are, for example, now available and used by many, made possible due to such technological advancements.

For instance, communication services, together with the network infrastructures and devices through which such services are provided, are now available and regularly used by many. Cellular, and other analogous, wireless communication systems are exemplary of the new communication services that have been developed and deployed, which take advantage of technological advancements. Successive generations of cellular communication systems have been deployed, each providing improved communication services and capabilities. New-generation, cellular communication system, for instance, provide significant data communication capabilities.

Typically, communications are carried out in a cellular, or cellular-like, communication system through use of a portable wireless device that includes transceiver circuitry. A portable wireless device is typically of compact dimensions to permit a user of the device to hand-carry the device. Users of such wireless devices, as a result, regularly hand-carry a wireless device and thereby have the wireless device available to use to communicate there through whenever the user elects, as long as the user is positioned within the coverage area of a cellular, or other analogous, communication system.

Some wireless devices provide additional functionalities, in addition to the functionalities provided by the transceiver circuitry. And, such a wireless device forms a multi-functional device that has multiple functionalities.

A wireless device sometimes, for instance, includes camera functionality. The camera functionality, typically implemented through use of a camera module, provides for the recordation of an image. Once recorded, the data forming the image is subsequently displayable at an image display element, either an image display element of the wireless device, or a display element positioned elsewhere. Existing wireless devices are capable, for instance, of transmitting the data representative of the recorded image by way of the cellular communication system to a remote location for storage or display thereat. The camera functionalities of some wireless devices, in addition to being capable of recording still images also are capable of recording video sequences. And, wireless devices having such capability are also typically capable of transmitting the recorded video sequences to remote locations by way of the cellular communication system.

Camera modules of portable wireless devices are usually dimensionally constrained. That is to say, the physical dimensions permitted of the camera module are limited due to the need to minimize the physical dimensions of the portable wireless device. And, due to this constraint, the capabilities of the camera functionality are sometimes also limited.

For instance, the size of a sensor that senses light energy during the image recordation procedure is limited due to this constraint. The sensor includes pixels that sense the receive light energy of different colors, and the limitation of the size of the sensor limits the number pixels that are available to sense the light energy. This limitation is particularly problematical in low-light conditions as there is a lesser amount of light energy incident at the available pixels, and the resultant, recorded image is of reduced quality.

The size constraints imposed upon camera modules also limits the size permitted of a camera lens. And, due to this limitation, the use of a low F-stop camera lens, for a given focal-length lens, is limited.

Therefore, existing camera modules that are size-constrained, such as camera modules used at portable wireless devices, suffer from various deficiencies that limit the quality of recorded images that can be obtained.

It is in light of this background information related to devices having camera functionality that the significant improvements of the present disclosure have evolved.

DETAILED DESCRIPTION

Figure 1:
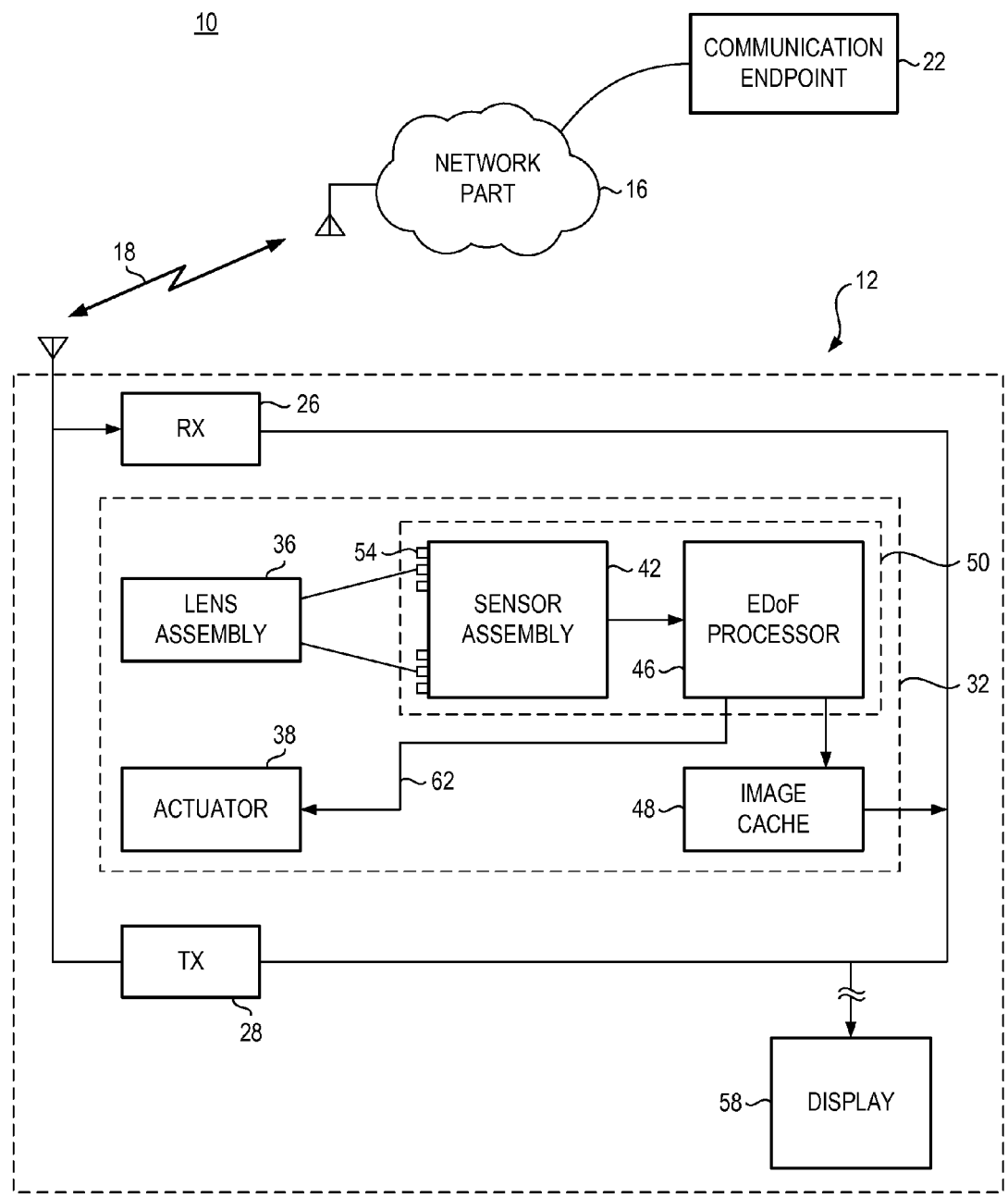
FIG. 1 illustrates a functional block diagram of a communication system having a device that includes an implementation of the present disclosure.

The present disclosure, accordingly, advantageously provides an apparatus, and an associated method, by which to record an image of a subject by a camera module, such as the camera module of a mobile station or other portable, wireless device.

Through operation of an implementation of the present disclosure, a manner is provided by which to record the image of a subject at an EDOF (Extended Depth Of Field) element, using EDOF image-portion selection using light focused by a camera lens translatable into a focus position.

In one aspect of the present disclosure, a translatable camera lens of low F-stop is utilized to provide improved camera performance in low-light conditions. The translatable camera lens is used in conjunction with EDOF image formation, which improves the depth of field characteristics of the resultant, recorded image relative to conventional, digital-camera recording elements.

In another aspect of the present disclosure, the camera lens is translatable through operation of an actuator. The actuator provides actuation forces that provide for the translation of the camera lens. The camera is translatable between a range of camera-lens positions. The position of the camera lens into different camera-lens position changes the location at which a subject is focused. The camera-lens position at which the subject is focused is dependent upon the characteristics of the camera lens, amongst other criteria.

In another aspect of the present disclosure, the actuator comprises an electrical actuator implementable in any of various manners. The actuator comprises, for instance, a voice coil motor, a Piezo electric motor, a stepping motor, or other motor capable of generating translation forces to provide for relatively precise, small-step translation movement.

In another aspect of the present disclosure, the camera lens comprises a low F-stop-lens. The lens comprises, e.g., a lens having an F-stop of less than 2.0. A camera lens that exhibits a low F-stop, i.e., a fast lens, exhibits an aperture of relatively large dimensions, thereby admitting a relatively large amount of light energy, which is particularly advantageous when images are to be recorded in low-light conditions. The low, F-stop lens is positionable into a selected lens position.

In another aspect of the present disclosure, an EDOF, Extended Depth of Field, element is utilized to sense incident light energy and to form an EDOF image therefrom. The EDOF element includes pixels that sense colors of the light energy incident thereon. And, EDOF processing is performed to create an EDOF image that forms the recorded image. The EDOF processing results in an image that is of improved depth of field characteristics relative to conventional image formation. The EDOF processing compensates for the limited depth of field inherent of low F-stop lenses.

In another aspect of the present disclosure, the sensors of the EDOF element include clusters of red, green, blue (RGB) pixels. The red, green, and blue color regions are focused differently. Recordations are made of images formed by the different pixel colors. And, the EDOF processing includes comparing corresponding portions of the separate images and selecting, for each portion, an image portion of one of the recorded images that exhibits the best quality. And, the non-selected portions are used to supply coloration rather than detail to the selected image portion. The image portions are, e.g., of 10 by 10 pixel squares. By selection of the image portion from amongst the multiple images, the portions exhibiting the best depth of field characteristics for that portion are selected, resulting in an image of an improved depth of field.

By utilizing both an extend depth of field element and a translatable camera lens, improved camera performance in low-light conditions is provided.

In these and other aspects, therefore, an apparatus, and an associated method, is provided for a camera module of an electronic device. An actuator is configured to provide camera-lens translation through a range of camera-lens positions. An extended depth of field element is configured to record an extended depth of field image of a sensed image, subsequent to camera-lens positioning of the actuator at a selected camera-lens position.

Turning first, therefore, to FIG. 1, a communication system, shown generally at 10, provides for radio communications with communication devices, here wireless devices of which the wireless device 12 is representative.

In the exemplary implementation, the communication system comprises a multi-user, wireless communication system. While a single wireless device 12 is illustrated in FIG. 1, in an actual implementation, typically, a large number of wireless devices are concurrently operable to perform communication services. The communication system 10 is representative, for instance, of a cellular communication system that operates in general conformity with a cellular communication system operating standard. More generally, the communication system 10 is representative of any of various communication systems, both radio and fixed, in which information is communicated with communication devices. Additionally, the functionality that shall be described below with respect to the wireless device 12 is alternately implementable at a standalone device, i.e., a device that is not used to communicate by way of a communication system.

The communication system 10, here implemented as a wireless communication system, includes a network part 16 having a network infrastructure including fixed radio transceivers capable of communicating with the wireless device 12 by way of radio channels defined upon a radio air interface 18. A communication endpoint 22 is connected to the network part 16. The communication endpoint is representative of any communication device placeable in communication connectivity with the network part 16 and, in turn, by way of radio channels on the radio air interface. That is to say, information originated at the wireless device 12 is routable to the communication endpoint 22. And, information originated at the communication endpoint 22 is routable to the wireless device 12.

The wireless device includes transceiver circuitry, here represented by a receive part (Rx) 26 and a transmit part (Tx) 28. The transceiver circuitry transceives communication signals with corresponding circuitry of the network part 16.

As noted previously, a wireless device regularly also includes additional functionality in addition to functionalities conventionally provided for telephonic and data communications. A function sometimes provided at a wireless device is a camera functionality. A camera functionality provides for the recordation of a subject image, either a still image or video sequence of images. When forming part of a portable wireless device, dimensional constraints necessitated to maintain the portability of the wireless device are also imposed upon the camera functionality. The camera functionality is embodied, at least in part, by a camera module, typically housed at the housing of the wireless device. Images recorded by the camera functionality are displayable at, e.g., at a display element of the wireless device or provided to another location to be stored, displayed, or viewed elsewhere.

The dimensional constraints imposed upon the camera module impose limitations on the characteristics of the elements of the camera module. For instance, the camera lens of a lens assembly of the camera module typically is a fixed lens configuration. And, the F-stop of the camera lens is typically relatively large as the maximum aperture of the lens is required to be relatively small. Due to the large F-stop of a conventional lens of such a camera module, the camera module does not provide for good quality image recording in low-light conditions.

The wireless device 12 includes a camera module 32 of an implementation of the present disclosure. While the camera module 32 is of physical dimensions corresponding to the physical dimensions of a conventional camera module, the functionality of the camera module 32 provides for improved image quality in low-light conditions while permitting construction of the camera module with looser tolerance, viz., of lessened requirements of manufacturing and assembly precision.

The camera module 32 is functionally represented, implementable in any desired manner including, for instance, hardware elements, firmware elements, algorithms executable by a processor, and combinations thereof. The module 32 is here shown to include a lens assembly 36, an actuator 38, a sensor assembly 42, and EDOF (Extended Depth of Field) processor 46, and an image cache 48. In one implementation, the functionality of the sensor assembly 42 and the EDOF processor 46 are formed at a single physical device 50. While the exemplary implementation shown in FIG. 1 illustrates the camera module to be a discrete module, in alternate implementations, the functionality of various elements of the camera module are embodied at portions of the wireless device circuitry. And, in other implementations in which the camera module forms part of a standalone device or part of another device, the elements of the camera module are embodied at, or form parts of, the standalone or other device.

The lens assembly 36 includes one or more camera lenses configured to exhibit a low F-stop, such as an F-stop of less than 2.0. In an exemplary implementation, the camera assembly 36 comprises two-five lens element stacks, i.e., a lens assembly having two-five camera lenses that are positioned in a manner together to define a camera lens of low F-stop. Conventionally, the lens assembly, particularly of a low F-stop configuration, must be precisely positioned in terms of at least decenter, and tilt as well as relative positioning between the lenses of the assembly. In an implementation of the present disclosure, the precision required in the positioning of the lenses is reduced and tolerances are increased to facilitate manufacture of the lens assembly.

One or more of the lenses of the lens assembly, or the entire lens assembly is translatable to reposition lens. The translation of the lens assembly, or lens thereof, is caused by application of translation forces provided by the actuator 38. The actuator 38, in the exemplary implementation, comprises an electric motor, such as a Piezo electric motor, a voice coil motor, a stepping motor, or any of various other motor-type capable of generating translation forces to permit relatively precise positioning of the affected lens or lenses.

The lens assembly is positioned in a manner such that light passing through the lens assembly representative of a subject is detectable by sensors 54 of the sensor assembly 42. The sensor 54 are arranged in groups of red, green, and blue (RGB) pixels. The different-colored pixels have different focus characteristics from one another. The sensor assembly generates electrical representations of the sensed light energy. Indications are provided to the EDOF processor 46. In one implementation, the sensor assembly and the EDOF processor are embodied in a common, physical element. The EDOF processor, howsoever implemented, processes the sensed indications and forms an EDOF image therefrom. The processing performed by the processor permits formation of a resultant image that has an extended depth of field. That is to say, the portion of the resultant image that is in-focus, when viewed, is greater than an image formed absent EDOF processing. The EDOF processing is particularly advantageous when the lens assembly, as in the exemplary implementation, exhibits a low F-stop. Low F-stop lenses inherently provide for images that are of small depths of field. Use of the EDOF processing to extend the depth of field of the sensed image improves the picture quality of the resultant image.

Once formed, the resultant image is stored at the image cache 48, available, e.g., for subsequent display at a display 58 of the device or to be transmitted by the transmit part 28 elsewhere, such as to the communication endpoint 22 for further use or display thereat.

In one implementation, the EDOF processor 46 further provides actuation instructions, here represented by way of the line 62, to the actuator 38. Actuation instructions include instructions to cause the actuator to generate translation forces to translate the lens assembly, or camera lens thereof. Such actuation changes the distance between the lens assembly and the pixels 54 of the sensor assembly. Thereby, in the event that the processing performed by the processor indicates that a better lens position would form improved images, such as images with greater depths of field, actuation is caused to be performed to reposition the lens by translating the lens assembly in an appropriate translation direction.

Figure 2:
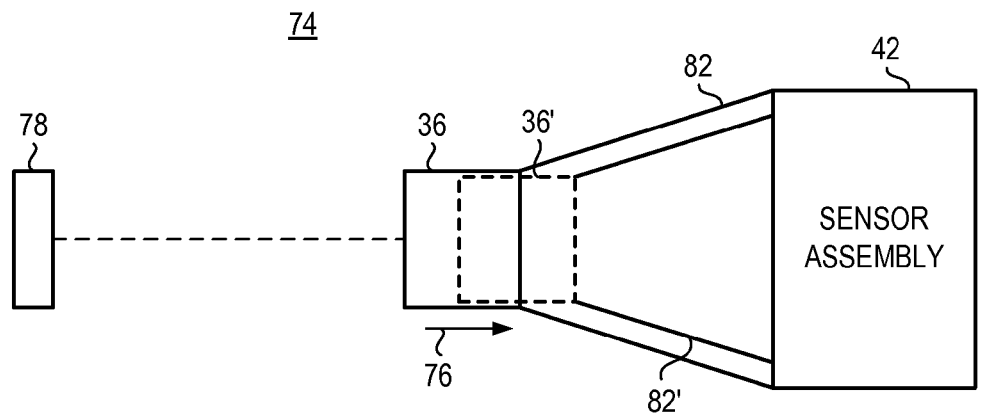
FIG. 2 illustrates a representation of operation of an extended depth of field (EDOF) image, divided into portions in which pursuant to operation to form an EDOF image.

Turning next to FIG. 2, a representation, shown generally at 74, illustrates the relationship between the position of the lens assembly 36 and the sensor assembly 42, which form portions of the apparatus 32, shown in FIG. 1. The lens assembly, or one or more lenses thereof, is translatable, here in the direction indicated by the arrow 76 (and in a direction opposite to that of the arrow 76). The translation is caused by application of translation forces provided by the actuator (shown in FIG. 1). The representation 74 illustrates the lens assembly 36 and the lens assembly, subsequent to translation, indicated by 36'.

A subject 78, whose image is to be recorded, is located in sight of the camera lens. That is to say, the device at which the lens assembly is positioned is positioned to sight the lens in the direction of the subject 78.

The image presented to the sensor assembly 42 is dependent upon the position of the lens assembly. When the lens assembly is positioned as indicated by the assembly 36, a first image having outlines indicated by the paths 82, are presented to the sensor assembly. And, the when the lens assembly is positioned as indicated at 36', the image presented to the pixels of the sensor assembly are indicated by the outline 82'. The image presented to the sensor assembly differs, depending upon the position of the lens assembly. By providing for translation of the lens assembly or a camera lens thereof, variations in lenses due to manufacturing and assembly tolerances are compensated for by translation of the lens.

Figure 3:
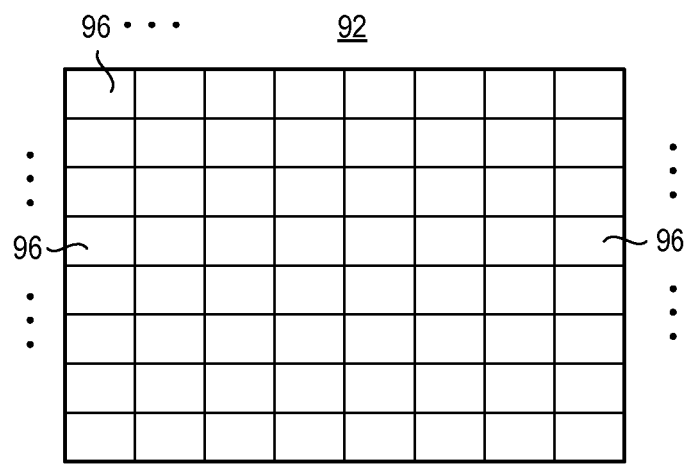
FIG. 3 illustrates a representation of the relationship between a camera lens translated between different positions pursuant to an implementation of the present disclosure.

FIG. 3 illustrates an exemplary image 92, representative of an image recorded during operation of an implementation of the present disclosure. Here, the image is divided into a plurality of regions 96. In the illustrated implementation, the regions define an array of horizontally and vertically aligned image portions. In operation, the multiple images are obtained, such as a separate image comprised of light sensed by the red, green, and blue pixels of the sensor assembly. The EDOF processing includes comparison of each of the separate images and selection of the image that exhibits the best characteristics. The non-selected portions are used for colorization purposes. The criteria for selection includes, for instance, the image portion of the corresponding, multiple image portions that exhibits the best depth of field. Thereby, the resultant image is of improved image quality, including improved depth of field characteristics.

Figure 4:
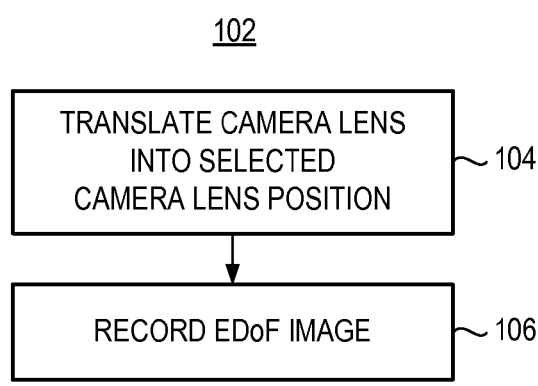
FIG. 4 illustrates a method flow diagram representative of the method of operation of an implementation of the present disclosure.

FIG. 4 illustrates a method flow diagram 102 representative of exemplary operation of an implementation of the present disclosure. The method 102 facilitates formation of a camera image at an electronic device.

First, and as indicated by the block 104, a camera lens is translated into a selected camera lens position of a range of camera lens positions. And, as indicated by the block 106, an extended-depth-of-field (EDOF) image of a sensed image is recorded. The EDOF image sensed at an EDOF element, is sensed subsequent to translation of the camera lens into the selected camera lens position Thereby, through use of a camera lens assembly that is translatable into a selected lens position, manufacturing and assembly tolerances of a lens assembly are easier to meet, while providing a low F-stop lens assembly that passes large amounts of light relative to higher F-stop lenses. The depth of field of the resultant, recorded image is improved as the EDOF processing provides for an image of improved depth of field characteristics.

Presently preferred implementations of the disclosure and many improvements and advantages have been described with a degree of particularity. The description is of preferred examples of implementing the disclosure, and the description of examples is not necessarily intended to limit the scope of the disclosure. The scope of the disclosure is defined by the following claims.

What is claimed is:

1. An electronic device, comprising:
 a camera module including an actuator configured to provide translation of a lens assembly through a range of camera-lens positions into a selected camera lens position;
 a sensor assembly having sensors positioned in groups of pixels, the groups of pixels including a first group of pixels having first focus characteristics and a second group of pixels having second focus characteristics, said sensor assembly configured to detect light;
 an extended depth of field (EDOF) processor configured to record, when said actuator causes positioning of the lens assembly to reach a single selected camera lens position, a first sensed image of a subject using the first group of pixels and a second sensed image of the subject using the second group of pixels, to compare corresponding portions of the first sensed image and second sensed image and to select, for each of the corresponding portions, an image portion of one of the first and second images that exhibits best EDOF characteristics to form a camera image.

2. The electronic device of claim 1 wherein said actuator comprises a stepping motor.

3. The electronic device of claim 1 wherein said range of camera-lens positions includes a macro-lens position.

4. The electronic device of claim 1 wherein said extended depth of field processor is configured to record a still, extended-depth-of field image.

5. The electronic device of claim 1 wherein said extended depth of field processor is configured to record a video sequence of camera images.

6. The electronic device of claim 1 further comprising a camera lens having an F-stop of less than 2.0.

7. The electronic device of claim 1 wherein said actuator comprises a voice coil motor.

8. The electronic device of claim 1 wherein said actuator comprises a Piezo electric motor.

9. The electronic device of claim 1 wherein said EDOF processor is further configured to provide actuation instructions to said actuator to change the camera-lens position when the EDOF processor indicates that a changed lens position would form improved camera images.

10. The electronic device of claim 1 wherein said lens assembly comprises a liquid-crystal camera lens and said actuator comprises an electromagnetic field voltage generator.

11. The electronic device of claim 1 wherein the electronic device comprises a multi-functional wireless mobile communication device comprising a transceiver connected to send and receive communication via a wireless network and further wherein said actuator and said extended depth of field processor comprise part of the camera module to provide camera functionality to the multi-functional wireless mobile communication device.

12. A method for facilitating formation of a camera image at an electronic device, said method comprising:
 translating a camera lens assembly of the electronic device into a selected camera lens position of a range of camera lens positions;
 recording, at a single selected lens position, a first sensed image of a subject using a first group of pixels of a sensor assembly of the electronic device and a second sensed image of the subject using a second group of pixels of the sensor assembly, the first group of pixels and the second group of pixels having different focus characteristics from each other;
 comparing corresponding portions of the first sensed image and the second sensed image; and
 selecting for each of the corresponding portions, a portion exhibiting best extended depth of field (EDOF) characteristics to form the camera image.

13. The method of claim 12 wherein said range of camera lens positions includes a macro lens position.

14. The method of claim 12 wherein said recording comprises recording still, extended-depth-of-field images.

15. The method of claim 12 wherein said recording comprises recording a video sequence of extended-depth-of-field images.

16. The method of claim 12 wherein said translating comprises generating a translation force by an electronic motor.

17. The method of claim 12 wherein the camera lens assembly comprises a liquid-crystal camera lens assembly and wherein said translating comprises applying an electromagnetic force to the liquid-crystal camera lens assembly.

18. A non-transitory computer-readable medium having instructions that when executed by a processor cause performance of a method of operating a camera module of an electronic device, the method comprising:
 translating a camera lens assembly of the electronic device into a selected lens position;
 recording, at the single selected lens position, a first sensed image using a first group of pixels of a sensor assembly of the electronic device and a second sensed image using a second group of pixels of the sensor assembly, the first group of pixels and the second group of pixels having different focus characteristics from each other;
 comparing corresponding portions of the first sensed image and the second sensed image; and
 selecting for each of the corresponding portions, a portion exhibiting best extended depth of field (EDOF) characteristics to form a camera image.

19. The non-transitory computer-readable medium of claim 18 wherein said translating comprises translating the camera lens into a selected lens position that focuses a subject image at the sensor assembly.

* * * * *